United States Patent
Tewari et al.

(10) Patent No.: US 8,296,667 B2
(45) Date of Patent: Oct. 23, 2012

(54) USER INTERFACE FOR DISPLAYING AND NAVIGATING RELATIONSHIPS BETWEEN OBJECTS GRAPHICALLY

(75) Inventors: Jayawant Tewari, Karnataka (IN); Muktha Hiremath, Karnataka (IN); Nakul P Shenoy, Karnataka (IN); Rashmi Sethi, Karnataka (IN)

(73) Assignee: SAP AG, Walldorf (DE)

( * ) Notice: Subject to any disclaimer, the term of this patent is extended or adjusted under 35 U.S.C. 154(b) by 1097 days.

(21) Appl. No.: 11/831,980

(22) Filed: Aug. 1, 2007

(65) Prior Publication Data

US 2009/0037848 A1 Feb. 5, 2009

(51) Int. Cl.
*G06F 3/048* (2006.01)
(52) U.S. Cl. .............. 715/764; 715/835; 715/854
(58) Field of Classification Search .................. 715/764, 715/835
See application file for complete search history.

(56) References Cited

U.S. PATENT DOCUMENTS

| | | | | |
|---|---|---|---|---|
| 5,745,113 A * | 4/1998 | Jordan et al. | .................. | 715/835 |
| 6,154,220 A * | 11/2000 | Prakriya et al. | ................ | 345/440 |
| 6,263,301 B1 * | 7/2001 | Cox et al. | ......................... | 703/14 |
| 6,327,586 B1 * | 12/2001 | Kisiel | ................................... | 1/1 |
| 6,486,898 B1 * | 11/2002 | Martino et al. | ................ | 715/853 |
| 6,532,287 B1 * | 3/2003 | Kossldorfer | .................. | 379/219 |
| 6,584,469 B1 * | 6/2003 | Chiang et al. | ......................... | 1/1 |
| 6,897,867 B2 * | 5/2005 | Katayama | ..................... | 345/440 |
| 7,120,646 B2 * | 10/2006 | Streepy, Jr. | ........................... | 1/1 |
| 7,343,365 B2 * | 3/2008 | Farnham et al. | .............. | 715/853 |
| 7,594,191 B2 * | 9/2009 | Leidig et al. | .................. | 715/825 |
| 7,689,525 B2 * | 3/2010 | Drucker et al. | .................. | 706/45 |
| 2002/0026630 A1 * | 2/2002 | Schmidt et al. | ............... | 717/103 |
| 2002/0171687 A1 * | 11/2002 | Li et al. | .......................... | 345/853 |
| 2003/0117436 A1 * | 6/2003 | Kautto-Koivula et al. | ... | 345/762 |
| 2005/0132297 A1 * | 6/2005 | Milic-Frayling et al. | ..... | 715/745 |
| 2005/0210008 A1 * | 9/2005 | Tran et al. | ......................... | 707/3 |
| 2006/0271526 A1 * | 11/2006 | Charnock et al. | ................. | 707/3 |
| 2007/0214179 A1 * | 9/2007 | Hoang | ....................... | 707/104.1 |
| 2007/0234234 A1 * | 10/2007 | Leidig et al. | .................. | 715/825 |
| 2008/0163118 A1 * | 7/2008 | Wolf | .............................. | 715/835 |
| 2008/0270458 A1 * | 10/2008 | Gvelesiani | ................ | 707/103 R |

* cited by examiner

Primary Examiner — Stephen Alvesteffer

(57) ABSTRACT

Disclosed is a user interface for displaying and navigating relationships between objects. The user interface includes an object relationship map to display a first object at center of the object relationship map and a second object related to the first object adjacent to the first object with a line connecting the second object and the first object. If the second object includes a plurality of objects, the object relationship map displays each of the plurality of objects around the first object. The user interface includes a side bar to display a nature of relationship between the first object and the second object. A relationship-type control in the side bar specifies the object relationship map to display the second object related to the first object with a nature of relationship selected from the relationship-type control. A degree of separation control in the side bar specifies a number of levels of relationship to be displayed in the object relationship map. The object relationship map displays a related-objects value on the second object denoting a number of objects related to the second object.

17 Claims, 9 Drawing Sheets

USER INTERFACE FOR DISPLAYING AND NAVIGATING RELATIONSHIPS BETWEEN OBJECTS GRAPHICALLY

FIELD OF THE INVENTION

The invention generally relates to the field of graphical user interfaces and more specifically to a way of graphically displaying and navigating relationships between objects.

BACKGROUND OF THE INVENTION

Many user interfaces display hierarchical relationships between objects and enable browsing the objects in a hierarchical fashion such as with a tree structure. A limitation of the tree structure is that only objects with a hierarchical relationship can be displayed and thus if objects at different hierarchies are related to one another, these relationships may not be depicted. Consider a sales scenario, wherein a tree structure may display a hierarchical relationship of objects involved in the sales scenario in the following way, a sales order at root node, a sales manager responsible for the sales order under the sales order, corresponding purchase order under the sales order. The tree structure may not display non hierarchical relationship such as, all sales orders that may be related to the sales manager, or it may not display relationship such as, all areas for which the sales manager is responsible for. Thus, it may not be possible to identify the objects sharing a non hierarchical relationship in the tree structure and it may not be possible to graphically display objects with a non hierarchical relationship.

SUMMARY OF THE INVENTION

What is disclosed is a user interface for displaying and navigating relationships between objects. The user interface includes an object relationship map to display a first object at center of the object relationship map and a second object related to the first object adjacent to the first object with a line connecting the second object and the first object. If the second object includes a plurality of objects, the object relationship map displays each of the plurality of objects around the first object. The user interface includes a side bar to display a nature of relationship between the first object and the second object. A relationship-type control in the side bar specifies the object relationship map to display the second object related to the first object with a nature of relationship selected from the relationship-type control. A degree of separation control in the side bar specifies a number of levels of relationship to be displayed in the object relationship map. The object relationship map displays a related-objects value on the second object denoting a number of objects related to the second object.

DETAILED DESCRIPTION

A user interface is generated for viewing a relationship between objects. The user interface includes an object relationship map to display the first object at center of the object relationship map and a second object related to the first object adjacent to the first object with a line connecting the second object and the first object. If the second object includes a plurality of objects, the object relationship map displays each of the plurality of objects around the first object. The user interface includes a side bar to display a nature of relationship between the first object and the second object. A relationship-type control in the side bar specifies the object relationship map to display the second object related to the first object with a nature of relationship selected from the relationship-type control. A degree of separation control in the side bar specifies a number of levels of relationship to be displayed in the object relationship map. The object relationship map displays a related-objects value on the second object denoting a number of objects related to the second object.

Figure 1:
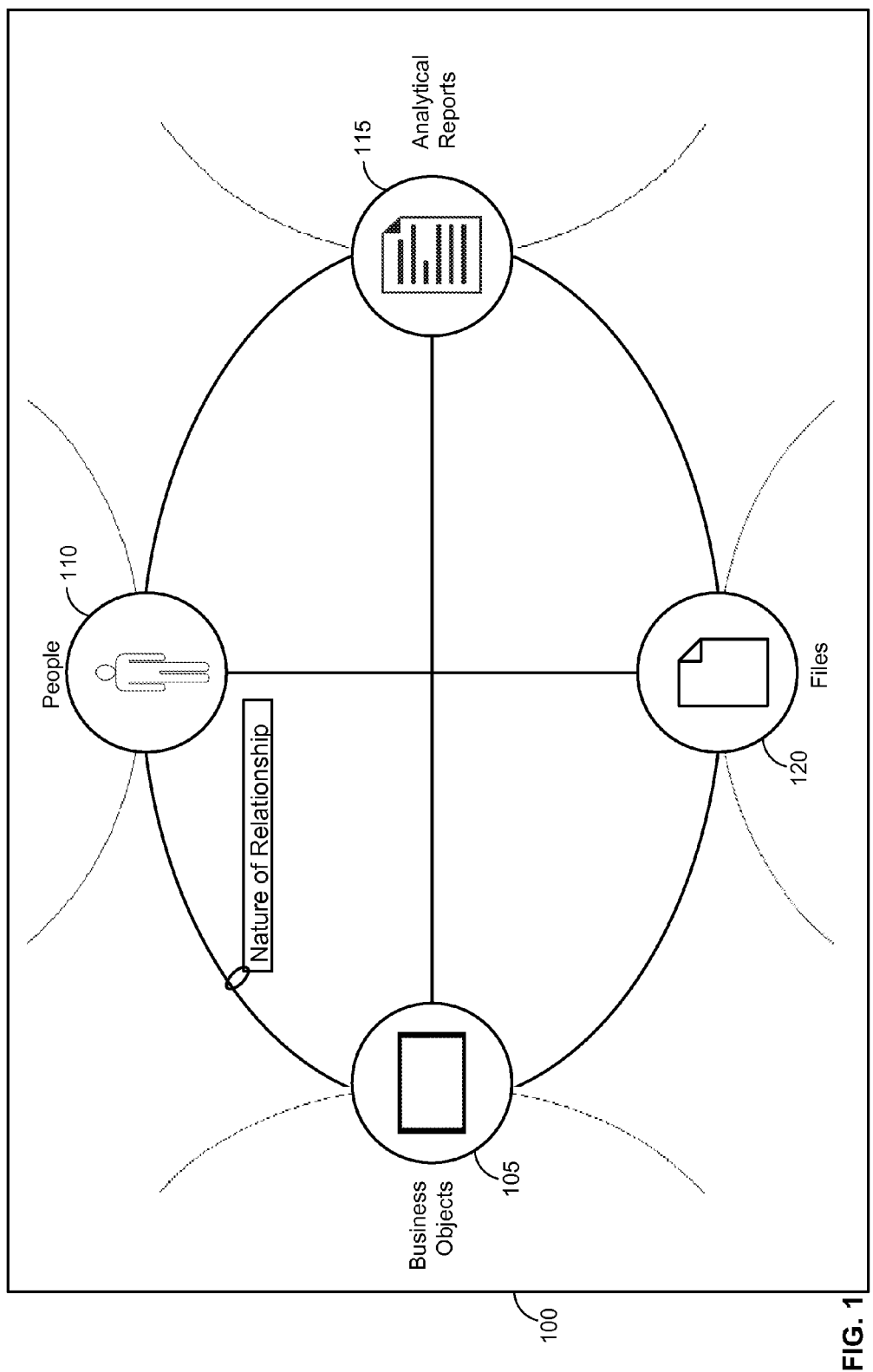
FIG. 1 is a block diagram of various types of enterprise objects and relationships between the enterprise objects according to an embodiment of the invention.

FIG. 1 is a block diagram of various types of enterprise objects and relationships between the enterprise objects according to an embodiment of the invention. A user interface may depict various kinds of relationships between objects that include enterprise objects. An enterprise object contains business data such as sales order number and name of sales representative. An enterprise object type 100 includes business objects 105, people 110, analytical reports 115, and files 120. Business objects 105 include enterprise objects such as sales order, purchase order, sales quote, and contract. People 110 include enterprise objects such as customers, sales managers, contact person, and supervisors. Analytical reports 115 includes enterprise objects such as sales report, profit report, turnover report, and inventory report. Files 120 includes enterprise objects such as price list, memo and holiday list. Various types of relationships may exist between enterprise objects. For example, a sales order in business objects 105 may be related to a sales manager in people 110 with a nature of the relationship as "employee responsible" and the sales order may also be related to another enterprise object in business objects 105 such as a purchase order with the nature of the relationship as "corresponding purchase order".

Figure 2:
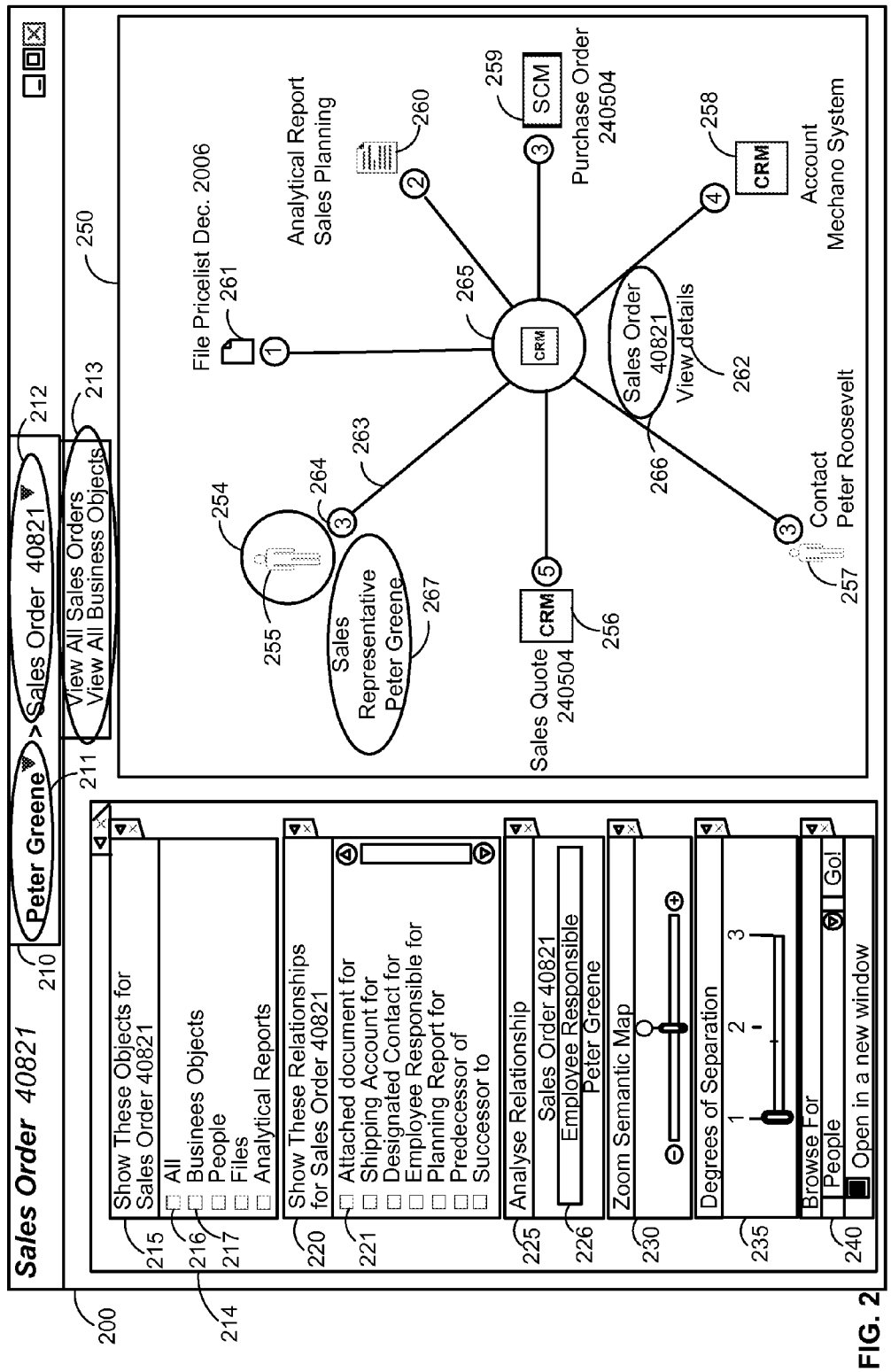
FIG. 2 is an example screen display of a user interface to display a first object and a second object related to the first object according to an embodiment of the invention.

FIG. 2 is an example screen display of a user interface to display a first object and a second object related to the first object according to an embodiment of the invention. User interface 200 displays enterprise objects and the relationships between the enterprise objects. User interface 200 graphically displays sales order 265 and enterprise objects such as sales representative 255, sales quote 256, contact 257, account 258, purchase order 259, analytical report 260, and file 261 related to sales order 265 using object relationship map 250 and the relationships between the enterprise objects in relationship-type control 220 and analyze relationship control 225 in side bar 214. Object relationship map 250 is a container in user interface 200 that displays the enterprise objects. Side bar 214 has controls to perform various actions on the enterprise objects displayed using object relationship map 250. User interface 200 facilitates a user to explore relationships between the enterprise objects by object types using a relationship-with control 215 in side bar 214. User interface 200 also facilitates the user to explore the relationships between the enterprise objects by relationship types using relationship-type control 220 in side bar 214.

Enterprise objects such as sales quote 256, account 258, and purchase order 259 are of object type business objects 105 as shown in FIG. 1. Enterprise objects such as sales representative 255 and contact 257 are of object type people 110. Enterprise object analytical report 260 is of object type analytical reports 115 and enterprise object file 261 is of object type files 120.

A first object such as sales order 265 shares a relationship with various enterprise objects such as sales representative 255, sales quote 256, contact 257, account 258, purchase order 259, analytical report 260, and file 261 which are graphically displayed around sales order 265 in object relationship map 250. A second object such as sales representative 255 is an employee responsible for sales order 265. Thus, the nature of the relationship between sales representative 255 and sales order 265 is "employee responsible" 226 displayed in analyze relationship control 225 in side bar 214. Similarly, the nature of the relationship between sales order 265 and other enterprise objects such as sales quote 256, contact 257, account 258, purchase order 259, analytical report 260, and file 261 is displayed in relationship-type control 220 in side bar 214.

Sales order 265 is displayed at the center of object relationship map 250 and sales representative 255 is displayed adjacent to sales order 265 with a straight line 263 connecting sales order 265 and sales representative 255, the straight line 263 denoting that sales representative 255 is related to sales order 265. A related-objects value 264 is displayed on sales representative 255 that denotes the number of enterprise objects related to sales representative 255. User interface 200 displays a list of two sales order attributes 266 in object relationship map 250 that includes "Sales Order", denoting the name of an enterprise object sales order 265 and "40821" denoting the number of sales order 265. Sales order attributes 266 are displayed adjacent to sales order 265. User interface 200 also displays a list of two sales representative attributes 267 in object relationship map 250 that includes "Sales Representative", denoting the name of the enterprise object sales representative 255 and "Peter Greene", denoting the name of sales representative 255. Sales representative attributes 267 are displayed adjacent to sales representative 255. Similarly, a plurality of enterprise objects such as sales quote 256, contact 257, account 258, purchase order 259, analytical report 260, and file 261 that share a relationship with sales order 265 are displayed around sales order 265 in object relationship map 250.

User interface 200 includes a breadcrumb 210 which enables a link to all enterprise objects explored by the user before exploring current enterprise object. Breadcrumb 210 displays a path the user has taken to the current enterprise object and context of the current enterprise object. In an embodiment, breadcrumb 210 displays a navigation from "Peter Greene" 211 to "Sales Order 40821" 212 signifying that the user has viewed relationships of sales representative 255 first and then navigated to sales order 265 to view relationships of sales order 265. Breadcrumb 210 also provides a drop-down menu 213 that contains a list of actions that may be performed on sales order 265.

User interface 200 includes side bar 214 that has controls to perform various actions on enterprise objects displayed using object relationship map 250. Side bar 214 includes controls relationship-with control 215, relationship-type control 220, analyze relationship control 225, zoom control 230, degrees of separation control 235, and search control 240.

The relationship-with control 215 specifies an object type of the enterprise object to be displayed in object relationship map 250 that shares a relationship with sales order 265. The user may choose to view enterprise objects of a specific enterprise object type that are related to sales order 265 by specifying the object type in relationship-with control 215. In an embodiment, if the user chooses the object type as "all" 216, then enterprise objects such as sales representative 255, sales quote 256, contact 257, account 258, purchase order 259, analytical report 260, and file 261 of all the enterprise object types 100 that have a relationship with sales order 265 are displayed using object relationship map 250. In another embodiment, if the user chooses the object type as "Business Objects" 217, then only enterprise objects of type business objects 105 such as sales quote 256, account 258 and purchase order 259 that have a relationship with sales order 265 are displayed in object relationship map 250. User interface 200 displays all enterprise objects such as sales representative 255, sales quote 256, contact 257, account 258, purchase order 259, analytical report 260, and file 261 that have a relationship with sales order 265 using object relationship map 250.

The relationship-type control 220 in side bar 214 displays the nature of the relationships between sales order 265 and other enterprise objects such as sales representative 255, sales quote 256, contact 257, account 258, purchase order 259, analytical report 260, and file 261. Object relationship map 250 displays sales order 265 and the enterprise objects that have the nature of the relationship selected in relationship-type control 220. A user may choose to view enterprise objects which have a specific nature of relationship with sales order 265 by choosing the nature of the relationship in relationship-type control 220. In an embodiment, the user may choose the nature of the relationship using a checkbox 221 as displayed in relationship-type control 220. If all relationships in relationship-type control 220 are chosen, then all enterprise objects such as sales representative 255, sales quote 256, contact 257, account 258, purchase order 259, analytical report 260, and file 261 having the chosen nature of the relationship with sales order 265 are displayed using object relationship map 250. In another embodiment, if a nature of relationship "employee responsible" 226 is chosen, then only sales representative 255 is displayed with sales order 265 in object relationship map 250 because sales order 265 shares the nature of the relationship "employee responsible" 226 only with sales representative 255.

The analyze relationship control 225 in side bar 214 displays a nature of relationship between sales order 265 and a selected enterprise object. If sales representative 255 is selected, object relationship map 250 displays a highlighted circle 254 around the image of sales representative 255. The nature of the relationship between sales representative 255 and sales order 265 "employee responsible" 226 is displayed in analyze relationship control 225. In one embodiment, sales representative 255 may be selected via a pointing device event such as mouse click event. In another embodiment, sales representative 255 may be selected via a pointing device event such as mouse over event.

The zoom control 230 in side bar 214 enables a user to zoom in and zoom out of object relationship map 250. Zoom control 230 increases and decreases the size of the enterprise objects. The enterprise objects appear larger in object relationship map 250 upon zooming in and appear smaller upon zooming out.

The degree of separation control 235 in side bar 214 specifies the number of relationship levels to be displayed in object relationship map 250. Search control 240 in side bar 214 enables the user to search for an enterprise object of enterprise object type 100 specified in search control 240. In one embodiment, search control 240 opens a new window wherein the user may search for an enterprise object of an enterprise object type 100 specified in search control 240 by entering search parameters.

Figure 3:
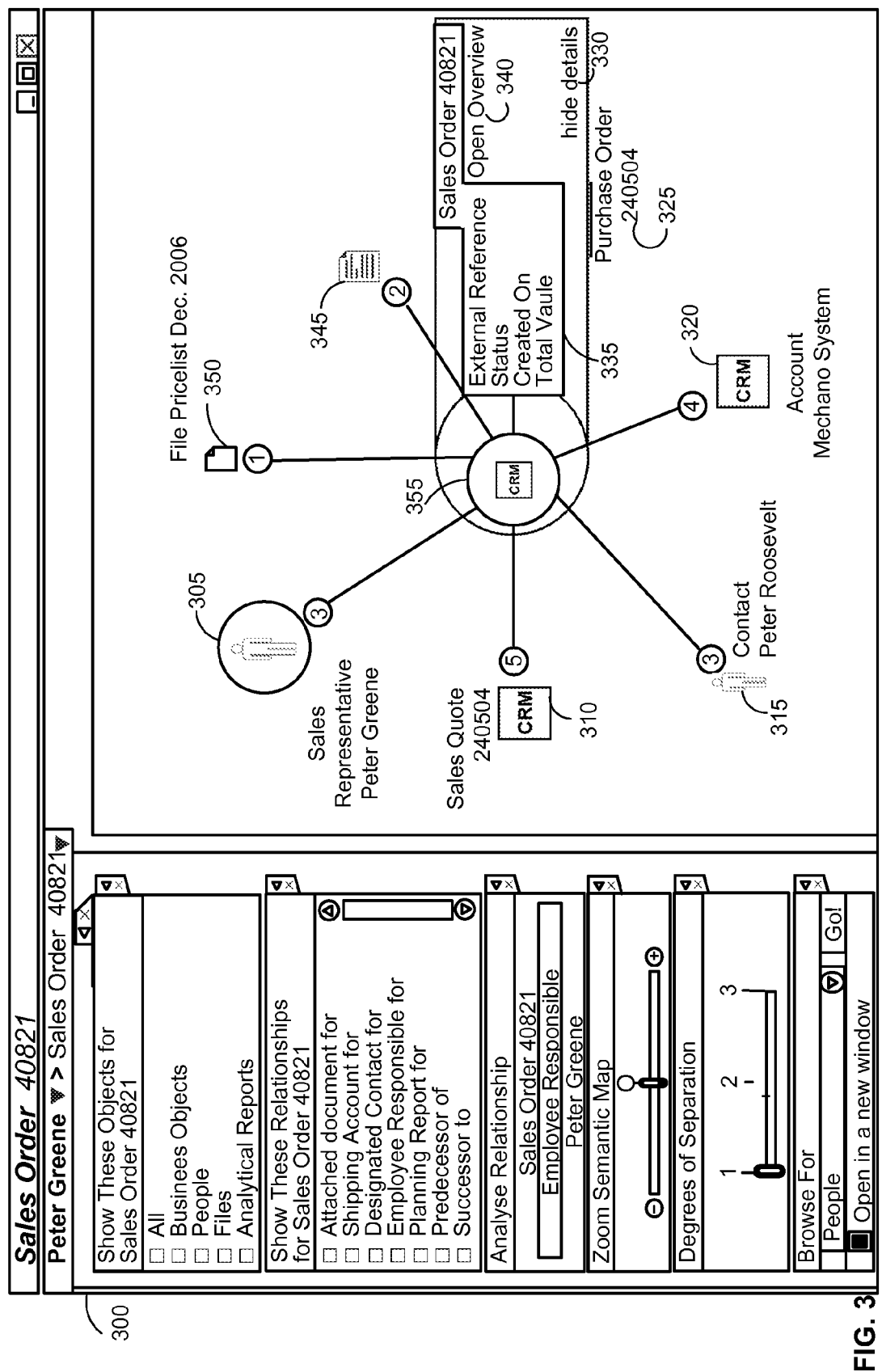
FIG. 3 is an example screen display of the user interface of FIG. 2 to display a list of attributes of a first object according to an embodiment of the invention.

FIG. 3 is an example screen display of the user interface of FIG. 2 to display a list of attributes of a first object according to an embodiment of the invention. The list of attributes of first object sales order 355 is displayed by selecting "view details" link 262 as shown in FIG. 2. User interface 300 displays the list of sales order attributes 335 in pop-up window 330 adjacent to sales order 355. In one embodiment, the list of sales order attributes 335 includes attributes such as sales order number, external reference, status, created on, and total value of sales order 355. An overview of sales order 355 may be viewed by selecting "open overview" link 340. The overview of sales order 355 is displayed in a new window. User interface 300 also enables the user to view enterprise objects such as sales representative 305, sales quote 310, contact 315, account 320, purchase order 325, analytical reports 345, and file 350 related to sales order 355 and the nature of the relationships between the enterprise objects.

Figure 4:
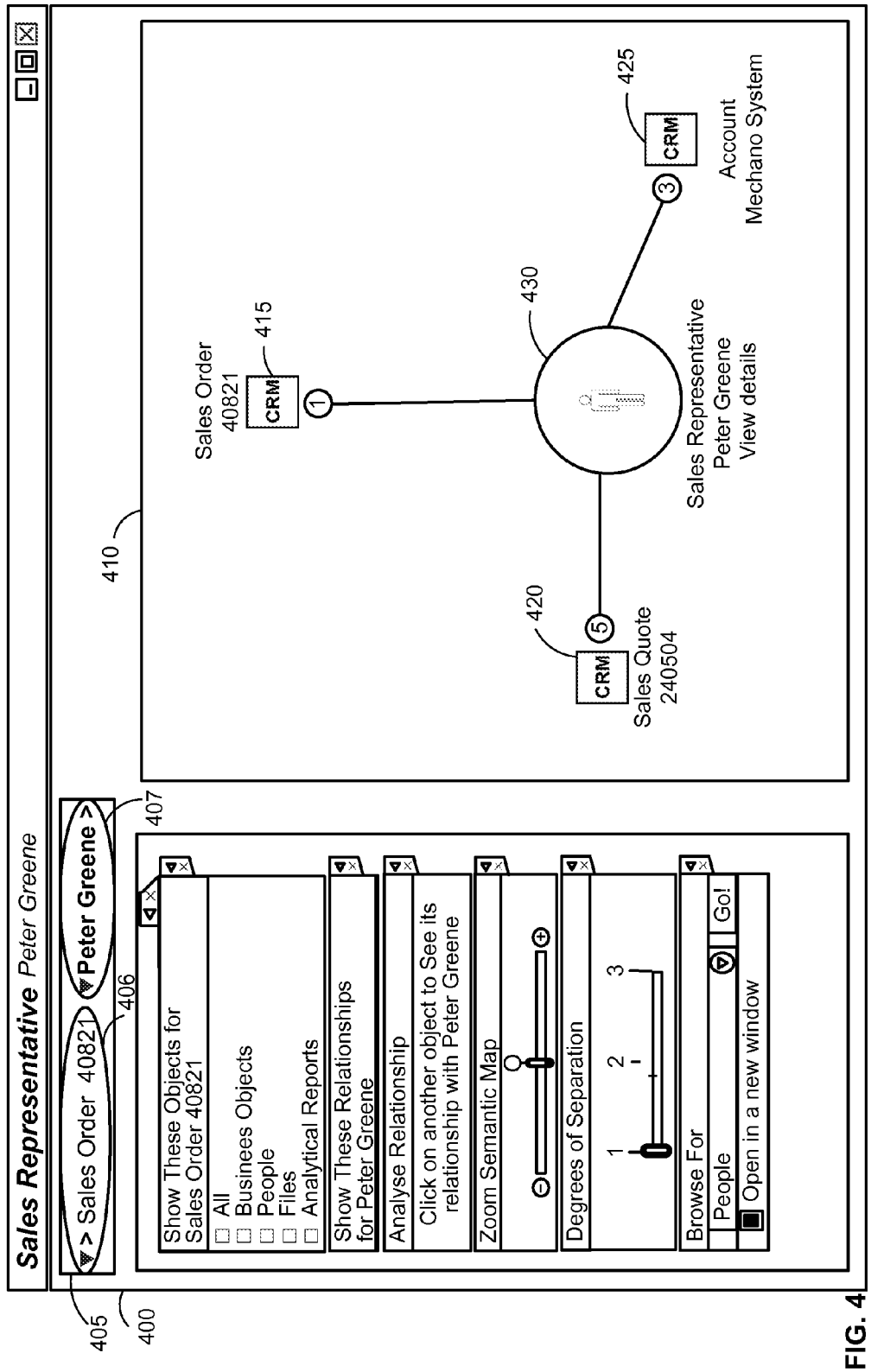
FIG. 4 is an example screen display of the user interface of FIG. 2 to navigate from a first object to a second object and display a third object related to the second object according to an embodiment of the invention.

FIG. 4 is an example screen display of the user interface of FIG. 2 to navigate from a first object to a second object and display a third object related to the second object according to an embodiment of the invention. A user may navigate to the second object such as sales representative 255 as shown in FIG. 2 from the first object such as sales order 265 to view a third object such as sales order 415, sales quote 420, and account 425 related to sales representative 430. In an embodiment, the user may navigate to sales representative 255 via a pointing device event such as double-click mouse event which displays sales representative 430 at the center of object relationship map 410 in user interface 400. The enterprise objects such as sales order 415, sales quote 420, and account 425 that are related to sales representative 430 are graphically displayed using object relationship map 410 around sales representative 430. The three enterprise objects sales order 415, sales quote 420, and account 425 correspond to related-objects value 264 on sales representative 255 in object relationship map 250, related-objects value 264 denoting the number of enterprise objects related to sales representative 255. User interface 400 contains breadcrumb 405 that displays a navigation from sales order 265 to sales representative 430 which is "Sales Order 40821" 406 to "Peter Greene" 407.

Figure 5:
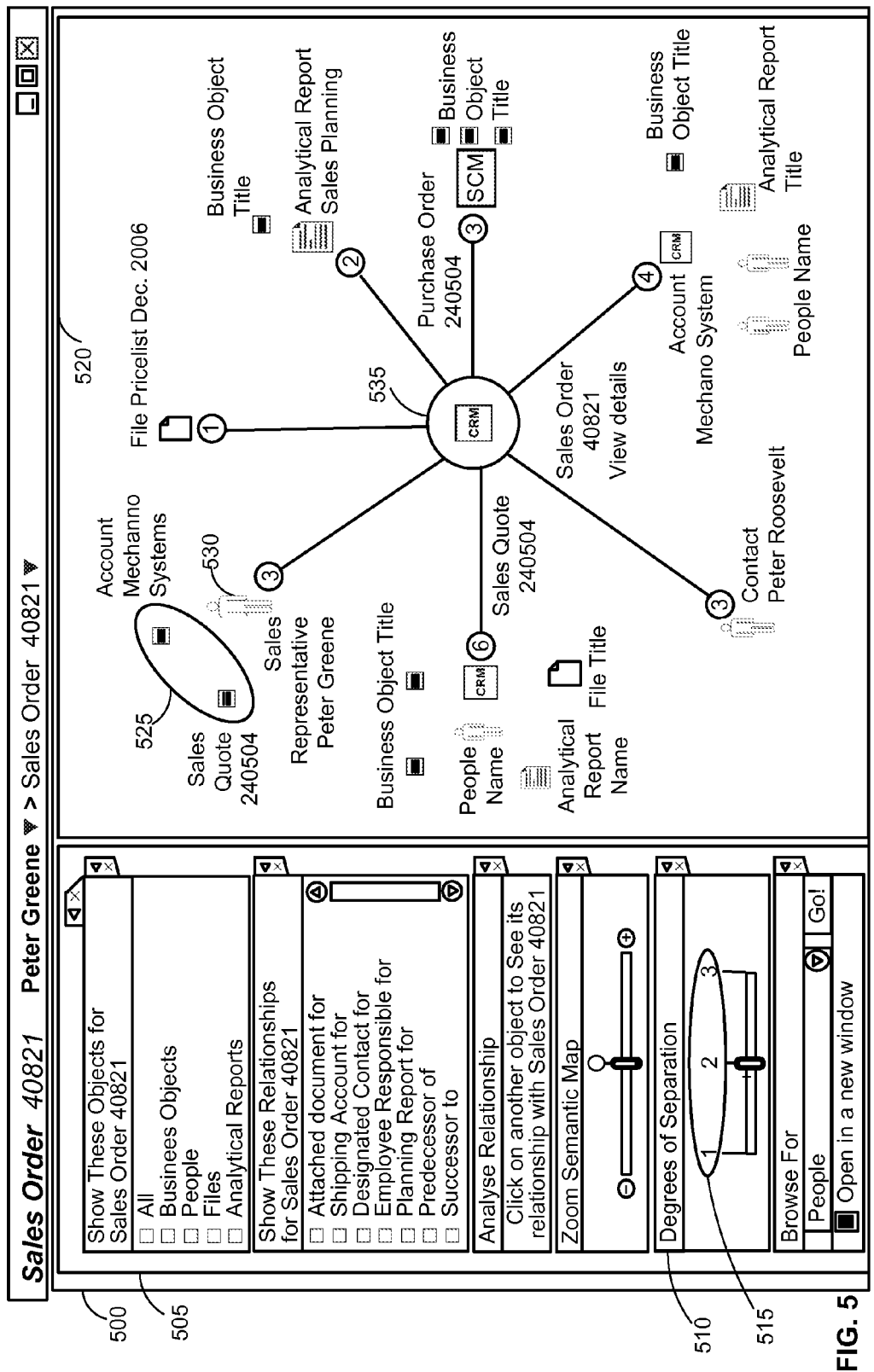
FIG. 5 is an example screen display of the user interface of FIG. 2 to display different levels of relationships between enterprise objects according to an embodiment of the invention.

FIG. 5 is an example screen display of the user interface of FIG. 2 to display different levels of relationships between enterprise objects according to an embodiment of the invention. Side bar 505 in user interface 500 includes degrees of separation control 510 that specifies the number of relationship levels to be displayed in object relationship map 520. If a user sets degrees of separation value 515 to "1", object relationship map 520 displays one level of relationship, that is, a sales order 265 and sales representative 255 related to sales order 265 as shown in FIG. 2. If the user sets degrees of separation value 515 to "2", object relationship map 520 displays two levels of relationships. At a first level of relationship, sales order 535 and sales representative 530 related to sales order 535 are displayed and at a second level of relationship, enterprise objects 525 related to sales representative 530 are displayed. The user has two options to view enterprise objects related to sales representative 530; as a first option, the user may navigate from sales order 265 to sales representative 255 to view related enterprise objects of sales representative 530. As a second option, the user may increase degrees of separation value 515 to more than "1" via degrees of separation control 510 in side bar 505 to view enterprise objects 525 and sales order 535 that are related to sales representative 530. In another embodiment, if the user sets the degrees of separation value 515 to "3", object relationship map 520 displays three levels of relationship.

Figure 6:
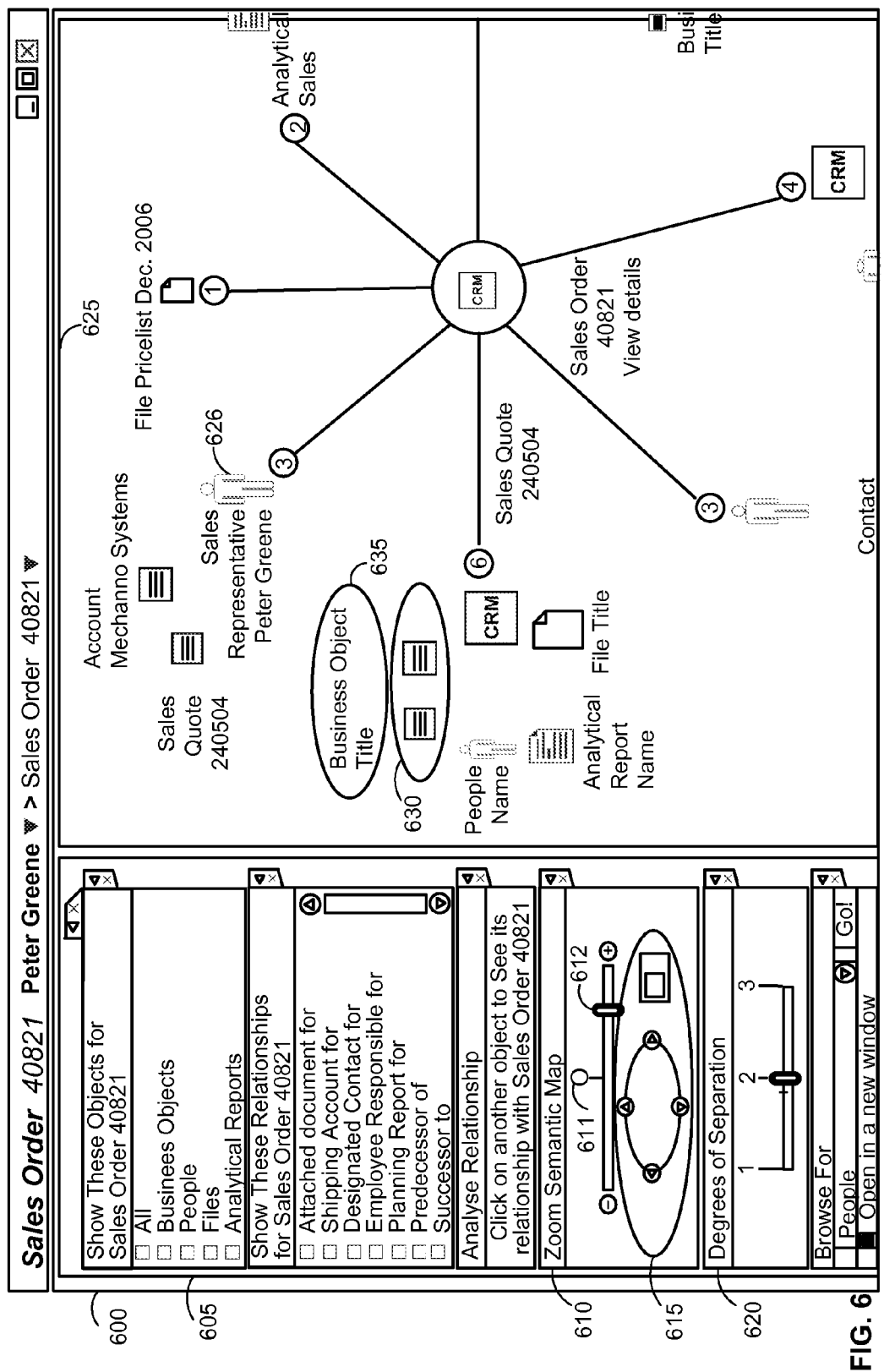
FIG. 6 is an example screen display of the user interface of FIG. 5 to illustrate a zoom control according to an embodiment of the invention.

FIG. 6 is an example screen display of the user interface of FIG. 5 to illustrate a zoom control according to an embodiment of the invention. Side bar 605 in user interface 600 includes zoom control 610 that enables a user to zoom in and zoom out of object relationship map 625. The user may zoom in by sliding slider 612 towards right of digit "0" 611 and may zoom out by sliding towards left of digit "0" 611. Zoom control 610 increases and decreases the size of enterprise objects 626 in object relationship map 625. The enterprise objects 626 appear larger in object relationship map 625 upon zooming in and appear smaller in object relationship map 625 upon zooming out. Zooming is useful when relationships with a degrees of separation value 620 greater than "1" are viewed in object relationship map 625 because the enterprise objects displayed in object relationship map 625, specifically, the second level enterprise objects 630 and attributes 635 may be too small to be seen clearly without zooming in. Zoom control 610 further includes navigation controls 615 that enable the user to pan enterprise objects up, down, left, and right in object relationship map 625.

Figure 7:
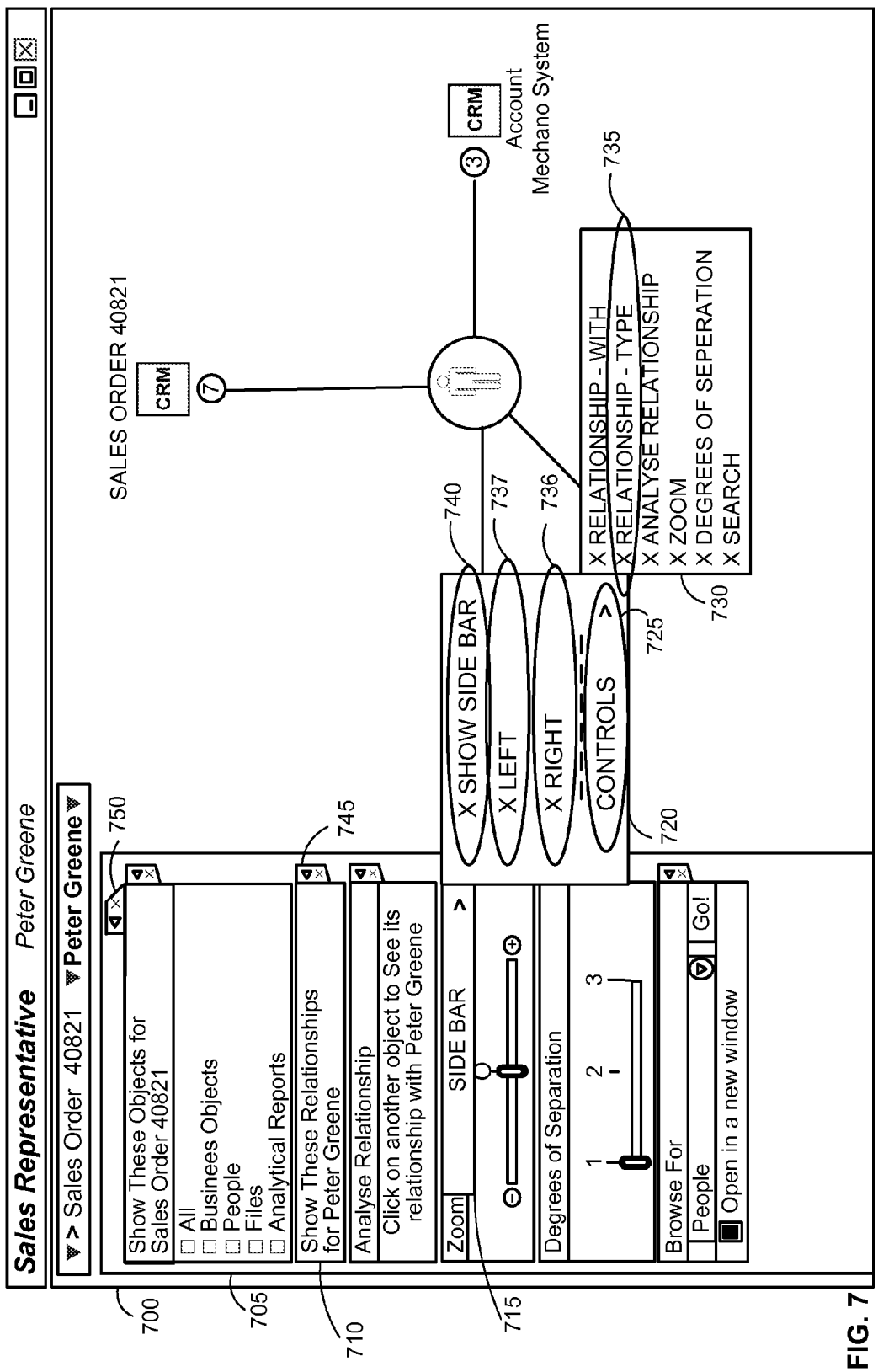
FIG. 7 and is an example screen display of a user interface to illustrate features of a side bar according to an embodiment of the invention.

FIG. 7 is an example screen display of a user interface to illustrate features of a side bar according to an embodiment of the invention. Side bar 705 may be minimized using buttons 750. Side bar 705 may be hidden by selecting "X" in buttons 750. User interface 700 displays side bar context menu 715 that enables a user to change the settings of side bar 705. In an embodiment, side bar 705 may be hidden or displayed by selecting "SHOW SIDE BAR" 740 in side bar sub menu 720. Side bar 705 may be moved to either ends of user interface 700, that is, to a left end of user interface 700 or to a right end of user interface 700. Side bar 705 may be displayed at the left end of user interface 700 by selecting "LEFT" 737 and may be displayed at the right end of user interface 700 by selecting "RIGHT" 736 in side bar sub menu 720. In an embodiment, side bar context menu 715 may be displayed by a pointing device event such as a mouse right click event. Side bar sub menu 720 may be displayed by selecting "SIDE BAR" in side bar context menu 715.

Side bar 705 includes a minimized relationship-type control 710. Relationship-type control 710 may be minimized using buttons 745. Relationship-type control 710 may be maximized using buttons 745. In an embodiment, relationship-type control 710 may be hidden by selecting "X" in buttons 745. In another embodiment, relationship-type control 710 may be hidden or displayed by selecting "RELATIONSHIP-TYPE" 735 in controls sub menu 730. In an embodiment, controls sub menu 730 may be displayed by selecting "CONTROLS" 725 in side bar sub menu 720.

Figure 8:
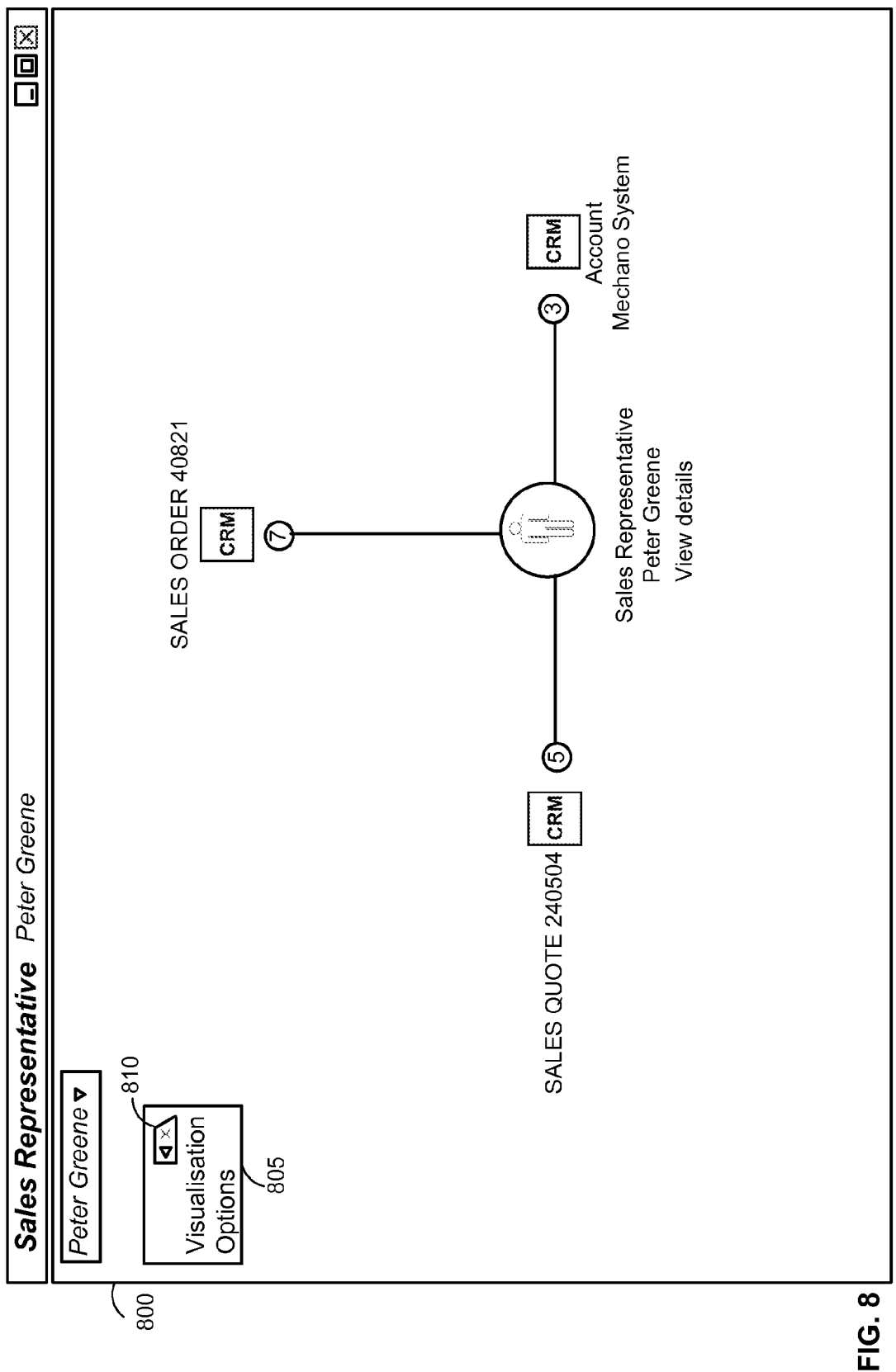
FIG. 8 is an example screen display of the user interface of FIG. 7 to illustrate a minimized side bar according to an embodiment of the invention.

FIG. 8 is an example screen display of the user interface of FIG. 7 to illustrate a minimized side bar according to an embodiment of the invention. User interface 800 displays a minimized side bar 805. Side bar 805 may be maximized using button 810. Side Bar 805 may be further hidden by selecting "X" in buttons 810.

Figure 9:
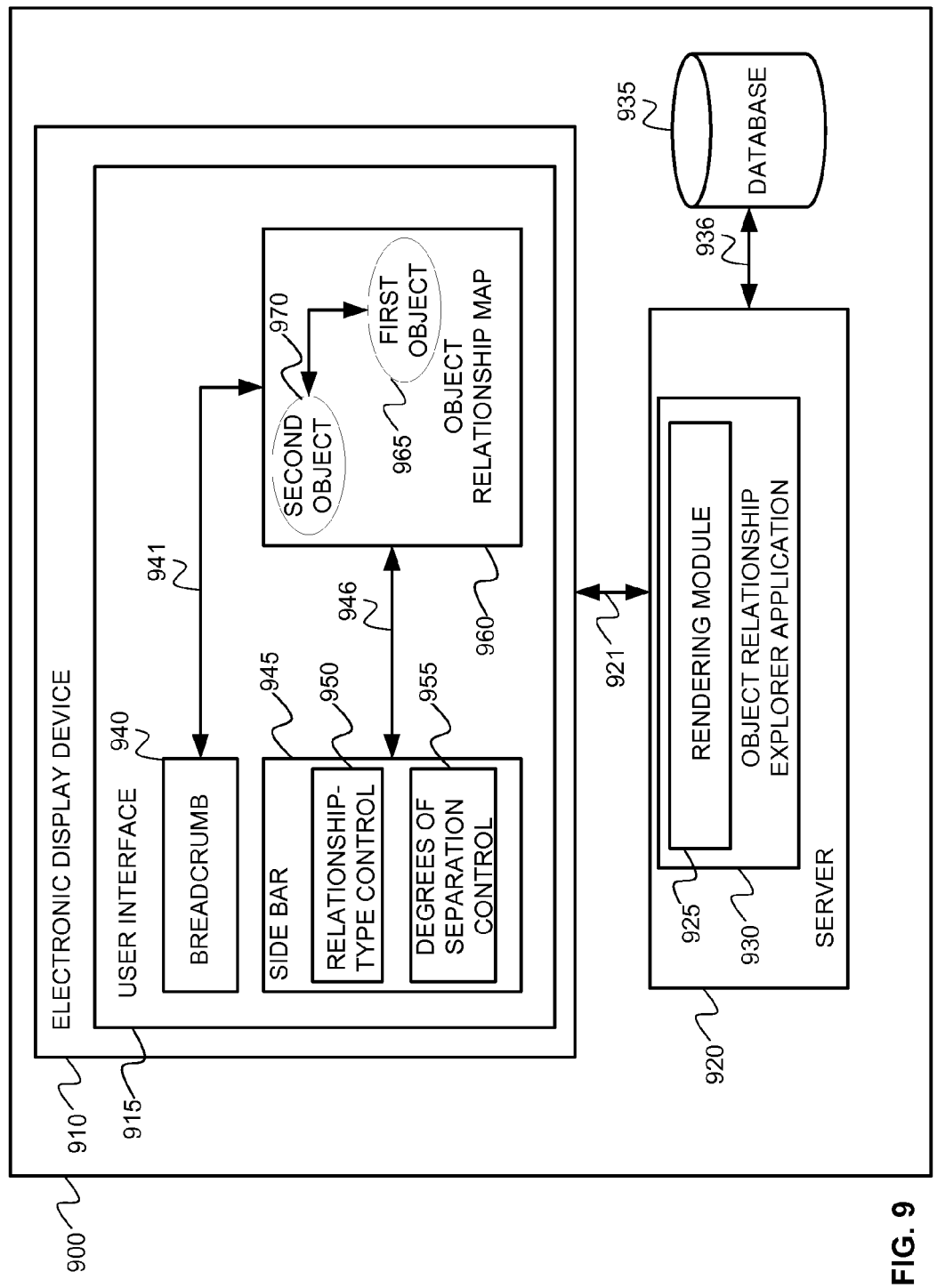
FIG. 9 is a block diagram of a system to display a first object and a second object related to the first object according to an embodiment of the invention.

FIG. 9 is a block diagram of a system to display a first object and a second object related to the first object according to an embodiment of the invention. System 900 includes an electronic display device 910 such as a video screen to display user interface 915 that displays first object 965 and second object 970 related to first object 965 in object relationship map 960. User interface 915 includes side bar 945 electronically coupled at 946 to object relationship map 960 in order to display a nature of relationship between the first object 965 and second object 970. Side bar 945 includes relationship-type control 950 to specify object relationship map 960 to display second object 970 related to first object 965 with a nature of the relationship selected from relationship-type control 950. Side bar 945 includes degrees of separation control 955 to specify a number of relationship levels to be displayed in object relationship map 960. User interface 915 includes breadcrumb 940 electronically coupled at 941 to object relationship map 960 in order to display a navigation path from first object 965 to second object 970. Breadcrumb 940 enables the user to navigate to all enterprise objects that are already explored.

System 900 includes server 920 electronically coupled at 921 to electronic display device 910, the server 920 that contains an object relationship explorer application 930 to determine a relationship between first object 965 and second object 970. System 900 includes database 935 electronically coupled at 936 to server 920 that persistently maintains first object 965 and second object 970. Object relationship explorer application 930 determines the relationship between first object 965 and second object 970 by obtaining data about the first object 965 and second object 970 from database 935. Object relationship explorer application 930 includes rendering module 925 that renders user interface 915 on the electronic display device 910.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, any other type of machine-readable media suitable for storing electronic instructions. The present invention may be downloaded as a computer program which may be transferred from a remote computer (e.g., a server) to a requesting computer (e.g., a client) by way of a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A computerized method for displaying and navigating relationships between enterprise objects on a user interface, the method comprising:

displaying an object relationship map comprising a first object at center of the object relationship map and a second object related to the first object adjacent to the first object with a line connecting the second object and the first object;

displaying a relationship-type control to specify the object relationship map to display the second object related to the first object with a specific nature of relationship selected from the relationship-type control using a check box, wherein the specific nature of relationship comprises one or more of attached document, shipping account, designated contact, employee responsible, planning report, predecessor of and successor to;

displaying a relationship-with control to specify an object type of the second object to be displayed in the object relationship map, having a relationship with the first object, wherein the object type of the second object comprises one or more of business objects, people, files and analytical reports;

displaying a degree of separation control to specify a number of levels of relationship to be displayed in the object relationship map, wherein the object relationship map displays a third object related to the second object surrounding the second object based on a degree of separation value specified in the degree of separation control; and displaying a breadcrumb to provide a navigation path between the first object, second object and third object, wherein the breadcrumb further comprises a drop-down menu to enable viewing of details of the navigated objects.

2. The computerized method of claim 1, wherein the nature of relationship between the first object and the second object is displayed in a side bar by selecting the second object in the object relationship map.

3. The computerized method of claim 1, wherein the object relationship map displays the first object as a first image, the second object as a second image, an attribute of the first object adjacent to the first image and an attribute of the second object adjacent to the second image.

4. The computerized method of claim 3, wherein the object relationship map displays details of the first object in a pop-up window adjacent to the first image.

5. The computerized method of claim 1, wherein the object relationship map displays the third object related to the second object by moving the second object to the center of the object relationship map.

6. The computerized method of claim 1, wherein the relationship-type control, the relationship-with control and the degree of separation control are included in a side bar.

7. The computerized method of claim 6, wherein the side bar further comprises:

a zoom control to zoom in and zoom out of the object relationship map; and a search control to open a new window for searching the first object with an object type selected in the search control.

8. The computerized method of claim 7, wherein the zoom control further comprises a navigation control to facilitate navigation to different areas in the object relationship map.

9. The computerized method of claim 6, wherein the side bar is collapsible, concealable and viewable.

10. The computerized method of claim 6, wherein each control in the side bar is collapsible, concealable and viewable.

11. The computerized method of claim 1, further comprising displaying a related-objects value on the second object in the object relationship map to denote a number of objects related to the second object, wherein the object relationship map displays the related-objects value on the second object at an end point of the line connecting the second object with the first object.

12. A system for displaying and navigating relationships between enterprise objects comprising:
an electronic display device to display a user interface, wherein the user interface comprises:
an object relationship map to display a first object and a second object related to the first object with a line connecting the second object and the first object;
a relationship-type control to specify the object relationship map to display the second object related to the first object with a specific nature of relationship selected from the relationship-type control using a check box, wherein the specific nature of relationship comprises one or more of attached document, shipping account, designated contact, employee responsible, planning report, predecessor of and successor to;
a relationship-with control to specify an object type of the second object to be displayed in the object relationship map, having a relationship with the first object, wherein the object type of the second object comprises one or more of business objects, people, files and analytical reports;
a degree of separation control to specify a number of levels of relationship to be displayed in the object relationship map, wherein the object relationship map displays a third object related to the second object surrounding the second object based on a degree of separation value specified in the degree of separation control; and
a breadcrumb to display a navigation path between the first object, second object and third object, wherein the breadcrumb further comprises a drop-down menu to enable viewing of details of the navigated objects;
a server electronically coupled to the electronic display device that contains an object relationship explorer application to determine relationship between the first object and the second object; and
a database electronically coupled to the server that contains the first object and the second object.

13. The system of claim 12, wherein the object relationship explorer application further comprises a rendering module to display the first object and the second object related to the first object graphically in the object relationship map in the user interface.

14. The system of claim 12, wherein the object relationship explorer application further comprises a rendering module to display the first object and the second object related to the first object graphically in the object relationship map in the user interface.

15. An article of manufacture, comprising:
a non-transitory machine readable medium having instructions, which when executed by a machine cause the machine to generate a user interface comprising:
an object relationship map to display a first object at center of the object relationship map and to display a second object related to the first object adjacent to the first object with a line connecting the second object and the first object;
a relationship-type control to specify the object relationship map to display the second object related to the first object with a specific nature of relationship selected from the relationship-type control using a check box, wherein the specific nature of relationship comprises one or more of attached document, shipping account, designated contact, employee responsible, planning report, predecessor of and successor to;
a relationship-with control to specify an object type of the second object to be displayed in the object relationship map, having a relationship with the first object, wherein the object type of the second object comprises one or more of business objects, people, files and analytical reports;
a degree of separation control to specify a number of levels of relationship to be displayed in the object relationship map, wherein the object relationship map displays a third object related to the second object surrounding the second object based on a degree of separation value specified in the degree of separation control; and
a breadcrumb to display a navigation path between the first object, second object and third object, wherein the breadcrumb further comprises a drop-down menu to enable viewing of details of the navigated objects.

16. The article of manufacture of claim 15, wherein the relationship-type control, the relationship-with control and the degree of separation control are included in a side bar.

17. The article of manufacture of claim 16, wherein the side bar further comprising:
a zoom control to zoom in and zoom out of the object relationship map; and
a search control to open a new window for searching the first object with an object type selected in the search control.

* * * * *